US012787932B2

(12) United States Patent
Hunt et al.

(10) Patent No.: US 12,787,932 B2
(45) Date of Patent: Nov. 10, 2026

(54) CORN HEADER ROW UNIT CONTROL SYSTEM

(71) Applicant: CNH Industrial America LLC, New Holland, PA (US)

(72) Inventors: Cory Douglas Hunt, Millersville, PA (US); Bart M. A. Missotten, Herent (BE); Dre Waltherus Joachim Jongmans, Klundert (NL)

(73) Assignee: CNH Industrial America LLC, New Holland, PA (US)

( * ) Notice: Subject to any disclaimer, the term of this patent is extended or adjusted under 35 U.S.C. 154(b) by 17 days.

(21) Appl. No.: 18/379,005

(22) Filed: Oct. 11, 2023

(65) Prior Publication Data

US 2024/0138303 A1 May 2, 2024

Related U.S. Application Data

(60) Provisional application No. 63/416,040, filed on Oct. 14, 2022.

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC ................ A01D 41/141; A01D 41/127; A01D 41/1271; A01D 45/021; A01D 45/025
See application file for complete search history.

(56) References Cited

U.S. PATENT DOCUMENTS 3,546,860 A * 12/1970 Pool ........................ A01D 69/00
56/DIG. 15
6,185,990 B1 * 2/2001 Missotten ............ A01B 79/005
56/10.2 A (Continued)

FOREIGN PATENT DOCUMENTS

CN 107996132 A 5/2018
CN 106416627 B 9/2018

(Continued)

OTHER PUBLICATIONS

Extended European Search Report and Written Opinion for EP Application No. 23203658.2 dated Mar. 25, 2024 (seven pages).

(Continued)

*Primary Examiner* — Wade Miles
*Assistant Examiner* — Jaewook Jung
(74) *Attorney, Agent, or Firm* — Fletcher Yoder, P.C.

(57) ABSTRACT

A control system for a row unit of a corn header includes a memory configured to store instructions and one or more processors configured to execute the instructions. The instructions, when executed by the one or more processors, cause the one or more processors to receive a signal from a sensor indicative of a measured stalk height. The instructions, when executed by the one or more processors, also cause the one or more processors determine the measured stalk height based on the signal. The instructions, when executed by the one or more processors, also cause the one or more processors to control a header pitch actuator to adjust a pitch angle of the row unit about a lateral axis of the corn header based on the measured stalk height.

19 Claims, 4 Drawing Sheets

(56) References Cited

U.S. PATENT DOCUMENTS

| | | | | |
|---|---|---|---|---|
| 8,843,283 | B2 | 9/2014 | Strelioff et al. | |
| 9,807,926 | B2 | 11/2017 | Wilken et al. | |
| 10,034,424 | B2 | 7/2018 | Anderson et al. | |
| 10,420,279 | B2 | 9/2019 | Briquet-Kerestedjian et al. | |
| 10,945,371 | B2 | 3/2021 | Lauff et al. | |
| 11,064,653 | B2 | 7/2021 | Zielke et al. | |
| 11,172,613 | B2 | 11/2021 | Weitenberg et al. | |
| 2010/0110428 | A1* | 5/2010 | Priesnitz | G01J 3/02 56/10.1 |
| 2014/0230392 | A1 | 8/2014 | Dybro et al. | |
| 2015/0305238 | A1* | 10/2015 | Klausmann | A01D 75/00 701/50 |
| 2016/0084813 | A1 | 3/2016 | Anderson et al. | |
| 2016/0084987 | A1* | 3/2016 | Dybro | G01V 99/00 702/5 |
| 2017/0049045 | A1* | 2/2017 | Wilken | A01D 41/06 |
| 2017/0208742 | A1 | 7/2017 | Ingibergsson et al. | |
| 2019/0302799 | A1* | 10/2019 | Schaff | G05D 1/0227 |
| 2020/0000034 | A1* | 1/2020 | Schlipf | A01B 63/111 |
| 2021/0153435 | A1 | 5/2021 | Martin et al. | |
| 2021/0185918 | A1* | 6/2021 | Hunt | A01D 41/141 |
| 2021/0315160 | A1 | 10/2021 | Zielke | |
| 2022/0132737 | A1 | 5/2022 | Anderson et al. | |

FOREIGN PATENT DOCUMENTS

| | | | |
|---|---|---|---|
| CN | 109548472 | A | 4/2019 |
| CN | 113179752 | A | 7/2021 |
| DE | 102021123998 | A1 | 4/2022 |
| EP | 3008990 | A2 | 4/2016 |
| EP | 3300580 | B2 | 4/2022 |
| WO | 2021261343 | A1 | 12/2021 |

OTHER PUBLICATIONS

Communication pursuant to Article 94(3) EPC for European Patent App. No. 23203658.2, dated Mar. 19, 2026, 5 pages.

* cited by examiner

CORN HEADER ROW UNIT CONTROL SYSTEM

CROSS-REFERENCE TO RELATED APPLICATION

This application claims priority to and the benefit of U.S. Provisional Application No. 63/416,040, entitled "CORN HEADER ROW UNIT CONTROL SYSTEM", filed Oct. 14, 2022, which is hereby incorporated by reference in its entirety.

BACKGROUND

The present disclosure relates generally to a corn header row unit control system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An agricultural system is used to harvest crops, such as barley, beans, beets, carrots, corn, cotton, flax, oats, potatoes, rye, soybeans, wheat, or other plant crops. Corn is a crop commonly harvested via agricultural systems. A combine (e.g., combine harvester) is a type of harvester generally used to harvest corn. During operation of a combine, the harvesting process may begin by removing agricultural crops from a field, such as by using a header. The header may cut the agricultural crops and transport the crops to a processing system of the combine.

The corn harvesting process involves aligning a header of a combine such that the rows of corn align with the row units of the header. As the harvester moves forward, feed rollers inside the header pull the stalks of the crop beneath the header, thereby separating the stalk from the ears of corn. As the stalk is pulled beneath the header, it simultaneously travels toward the picking location due to the row unit being tilted at an angle. If the header is not set at the correct pitch angle, stalk may reach the picking location before being pulled beneath the header, causing the stalk to enter the harvester along with the corn ears as material other than grain.

BRIEF DESCRIPTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a control system for a row unit of a corn header, comprising: a controller comprising: a memory configured to store instructions; and one or more processors configured to execute the instructions, wherein the instructions, when executed by the one or more processors, cause the one or more processors to: receive a signal from a sensor indicative of a measured stalk height; determine the measured stalk height based on the signal; and control a pitch actuator to adjust a pitch of the row unit about a lateral axis of the corn header, control a speed actuator to adjust a speed of one or more feed rollers of the row unit, or a combination thereof, based on the measured stalk height.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
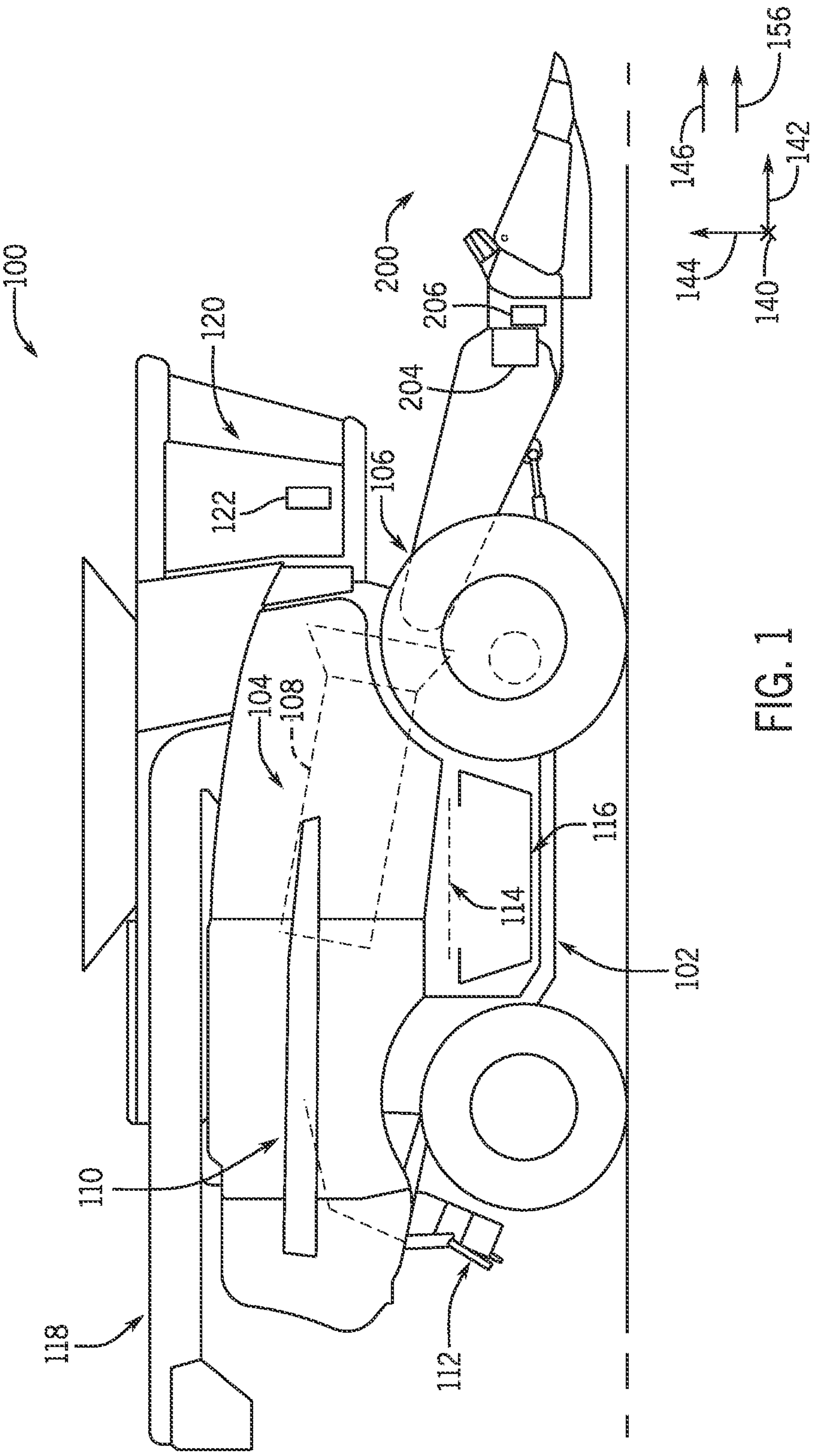
FIG. 1 is a side view of an embodiment of an agricultural system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Throughout the present disclosure, the term "optimal" is intended to mean achieving an enhanced value, not necessarily the most enhanced value. Throughout the present disclosure, the target header angle is assumed to be equivalent to a target angle of the row unit. As used herein, "match" refers to a difference between the angle and the target angle of less than threshold percentage (e.g., 5 percent, 4, percent, 3 percent, 2 percent, 1 percent, etc.) As used herein, "stalk height" refers to the height of the stalk above the row unit of the corn header. As used herein, "picking location" refers to the location at which the ear contacts the deck plates of the header, which may extend from the front of the deck plates to the rear of the row unit(s). Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material (e.g. ear) from the remainder of the crop. The agricultural system may be at least partially automated so as to harvest crops at least partially independently of human control. During automated harvesting, the agricultural system may encounter crops of varying heights (i.e. heights of the stalks). Accordingly, in certain embodiments disclosed herein, the agricultural system may be outfitted with one or more sensors. The agricultural system may utilize data gathered from the sensor(s) to adjust an angle of the header about a lateral axis, such that the entirety of the stalks of the crops are pulled beneath the feed rollers inside the row units of the header. In addition, sensor(s) may be used to detect the presence of a stalk at (e.g. rearward of) a picking location that was not pulled underneath the feed rollers.

In certain embodiments, at least one sensor (e.g., radar sensor) may point outwardly toward the crops, so as to detect a height of the stalks. A controller then uses the detected stalk height to adjust the pitch angle of the header about a lateral axis, such that the entire length of each stalk is pulled beneath the feed rollers before the stalk reaches a picking location (e.g. rear of the respective row unit) of the header. Additionally or alternatively, the header angle may be adjusted based on detection of presence of stalk(s) at (e.g. rearward of) the picking location via additional sensor(s).

With the foregoing in mind, FIG. 1 is a side view of an embodiment of an agricultural system 100 (e.g. harvester). The agricultural system 100 includes a chassis 102 configured to support a corn header 200 and an agricultural crop processing system 104. As described in greater detail below, the corn header 200 is configured to transport the crops toward an inlet 106 of the agricultural crop processing system 104 for further processing of the crops. The agricultural crop processing system 104 receives the crops from the corn header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., corn) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. The agricultural system 100 may also include a cabin 120. To facilitate discussion, the agricultural system 100 and/or its components (e.g., the corn header 200) may be described with reference to a lateral axis or direction 140, a longitudinal axis or direction 142, and a vertical axis or direction 144. The agricultural system 100 and/or its components may also be described with reference to a direction of travel 146.

In the illustrated embodiment, the agricultural system 100 includes one or more actuators configured to control the spatial orientation and/or position of the corn header 200 with respect to the agricultural system chassis 102, and/or the spatial orientation of the corn header 200 with respect to the crop rows or ground/soil. A header height actuator may drive the corn header 200 to move along the direction 144 relative to the ground. The corn header 200 may be attached to the chassis via a linkage (e.g., four-bar linkage, etc.). The position of the linkage may be controlled by the header height actuator to adjust the height of the corn header. The agricultural system 100 may also include a header roll actuator 204. The header roll actuator 204 may be configured to rotate the corn header 200 in roll relative to the ground about the longitudinal axis 142. The agricultural system 100 may also include a header pitch actuator 206. The header pitch actuator 206 may be configured to rotate the corn header 200 in pitch relative to the ground about the lateral axis 140. The agricultural system 100 may also include a steering system 122. The steering system 122 may be configured to control the direction of the agricultural system 100 and the corn header 200 along a path. The steering system 122 may include one or more mechanical and/or electronic components configured to control the steering components of the agricultural system, such as a set of hand controllers. The actuators and steering system 122 may be controlled in response to feedback to adjust the agricultural system 100 for one or more environmental variables (e.g., soil condition, terrain, crop properties, etc.). The agricultural system 100 may also include a harvester speed control system. The harvester speed control system may be configured to control the forward ground speed of the agricultural system 100 and/or corn header 200.

Figure 2:
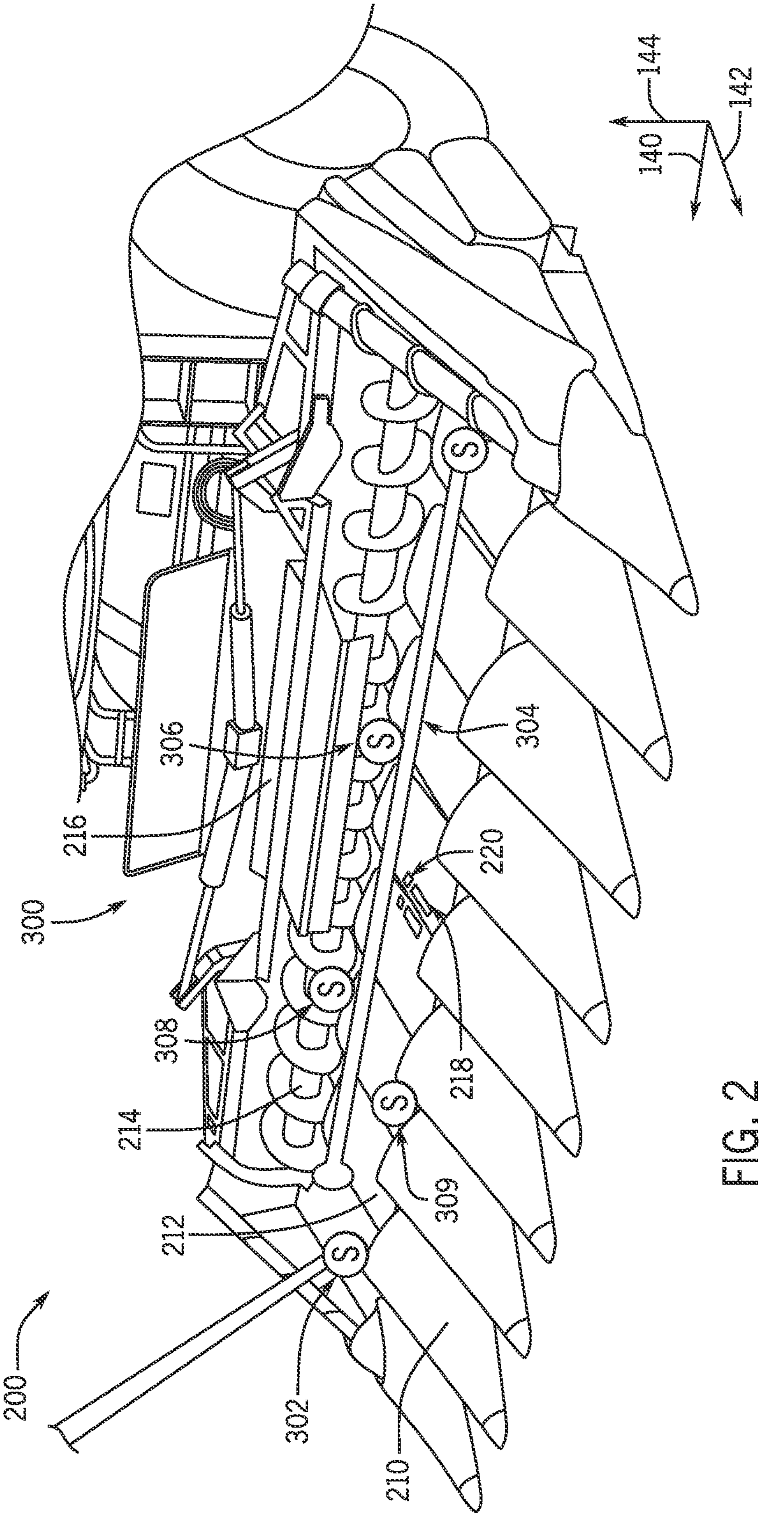
FIG. 2 is a perspective view of an embodiment of a corn header that may be employed within the agricultural system of FIG. 1, in accordance with an aspect of the present disclosure.

FIG. 2 is a perspective view of an embodiment of a corn header 200 that may be employed within the agricultural system of FIG. 1. In the illustrated embodiment, the header 200 includes multiple separators 210 configured to separate rows of a crop (e.g., corn). The separators 210 may be evenly spaced along the header horizontally. As the header moves along the path, the separators 210 may direct crops from each row to one or more row units 212. The row units 212 are configured to cut a portion of each crop (e.g., a stalk), thereby separating the crop from the soil. The crop may be directed to one of a pair of augers 214 configured to convey the crop laterally inward to a conveyor 216 at the center of the header. As illustrated, the augers 214 extend along a substantial portion of the width of the header 200 (e.g., along the lateral axis 140). The augers 214 may be driven by a driving mechanism (e.g., electric motor, hydraulic motor, etc.). As the agricultural system is driven through the field, the separators 210 direct the rows of crops into the row units 212. The row units engage the crops within the field, and the augers 214 transport the crop to the conveyor 216, which directs the crops toward the inlet of the agricultural crop processing system. Each row unit includes feed rollers 218 which pull the crops downward through the row units 212 during harvesting. As the stalks of the crops are pulled through the feed rollers 218, the ears are separated from the stalk and are conveyed toward the augers 214.

In the illustrated embodiment, a control system 300 for the corn header 200 includes radar sensor(s) 302 (e.g. millimeter wave, continuous wave, frequency-modulated continuous wave) coupled to the corn header 200 (e.g., to one or more row units 212). The radar sensor(s) 302 are configured to point upward relative to the ground, making a nonzero pitch angle with the longitudinal axis 142. The control system 300 also includes one or more sensors at (e.g. rearward of, near) the picking location. The sensor(s) are configured to detect the presence of a stalk of the crops at (e.g. rearward of) the picking location after the stalk has traveled from the front end of the row unit 212 to the picking location during harvesting. Although radar sensor(s) in the illustrated embodiment and throughout this disclosure, other types of sensors may be utilized as well.

In certain embodiments, presence of a stalk at (e.g. rearward of) the picking location is detected via lateral sensor(s) 304 (e.g. radar, emitter/receiver, laser, etc.) placed at (e.g. rearward of, near) the picking location. The lateral sensor(s) 304 may include a laser and a detector placed in front of the augers 214, and collectively span the combined width of the row units 212 in the lateral direction 140, such that the lateral sensor(s) 304 detect presence of a stalk at (e.g. rearward of) the picking location. The laser may direct a beam along the lateral axis of the corn header, such that the presence of stalk at (e.g. rearward of) the picking location causes an interruption in the beam, which is detected by the detector. In some embodiments, multiple lateral sensors 304 may be staggered and/or overlapping along the combined width of the row units 212, such that multiple sensors are utilized to cover the combined width. Multiple sensor may provide redundancy and may increase the detection effectiveness, as compared to just one sensor. In some embodiments, only one lateral sensor 304 may be used to span the combined width of the row units 212. Upon detecting presence of a stalk at (e.g. rearward of) the picking location via the lateral sensor(s) 304, a controller may control a speed actuator to adjust the feed roller speed, and/or the controller may control the header pitch actuator to adjust the pitch angle of the corn header 200.

In certain embodiments, force sensor(s) 306 (e.g. load cell, limit switch, force sensing resistor, etc.) are placed at (e.g. rearward of) the picking location. The force sensor(s) 306 are configured to detect the presence of a stalk at (e.g. rearward of) the picking location due to the stalk contacting the force sensor(s) 306. In some embodiments, the force sensor(s) 306 are positioned at the rear area of the feed rollers 218. Multiple force sensor(s) 306 may be located at varying positions and at varying angles (e.g. to enable the force sensor(s) 306 to monitor additional information about the row alignment of the row units 212). For example, if the row units 212 are misaligned, the misalignment may cause the stalk to be bent toward a lateral side of a row unit. Because the stalk is bent, force sensor(s) 306 offset from the center at (e.g. rearward of) the picking location may detect the stalk, providing an indication as to the direction in which the stalk is bent. Upon detecting a presence of a stalk at (e.g. rearward of) the picking location via the force sensor(s) 306, the controller may control a speed actuator to adjust the feed roller speed, and/or the controller may control the header pitch actuator to adjust the pitch angle of the corn header 200.

In certain embodiments, the feed rollers 218 of at least one row unit 212 are divided into two separate sections of rollers, such that one of the sections includes rear feed rollers 220 located (e.g. rearward of) the picking location. The rear feed roller(s) 220 may be configured to detect presence of stalk at (e.g. rearward of) the picking location by measuring a torque using one or more torque sensors (e.g. rotary torque sensor(s)). For example, when the stalk reaches the rear feed rollers 220, the increased load due to the stalk passing through the rear feed rollers 220 results in a higher torque measurement by the one or more torque sensors. Upon detecting a presence of a stalk at (e.g. rearward of) the picking location via the rear feed roller(s) 220, the controller may control a speed actuator to adjust the feed roller speed, and/or the controller may control the header pitch actuator to adjust the pitch angle of the corn header 200.

In certain embodiments, non-contact sensor(s) 308 (e.g. optical, radar, laser, ultrasonic, proximity, etc.) are placed at (e.g. rearward of) the picking location. The non-contact sensor(s) 308 are configured to be angled such that the field(s) of detection align with the row unit(s) 212, such that each sensor detects the presence of a stalk that reaches the picking location. In certain embodiments, the non-contact sensor(s) 308 may be used in combination with a spring-loaded stalk guide. When one or more stalks depresses the spring-loaded stalk guide, the stalk guide moves relative to the sensor. The sensor detects movement of the spring-loaded stalk guide, thereby facilitating detection of the stalk at (e.g. rearward of) the picking location. Upon detecting a presence of a stalk at (e.g. rearward of) the picking location via the non-contact sensor(s) 308, the controller 310 may control a speed actuator to adjust the feed roller speed, and/or the controller may control the header pitch actuator to adjust the pitch angle of the corn header 200. In certain embodiments, a combination of the above alternative sensor configurations (e.g. lateral sensor(s) 304, force sensor(s) 306, rear feed roller(s) 220, non-contact sensor(s) 308, etc.) may be used to detect the presence of a stalk at (e.g. rearward of) the picking location. In certain embodiments, the non-contact sensor(s) 308 may be configured to include an emitter and detector positioned near a picking location for a single row unit, such that upon a stalk breaking a beam emanating from the emitter, the detector is configured to detect the presence of the stalk. In certain embodiments, the emitter and detector may be positioned on the hood 228 of the corn header 200.

In certain embodiments, non-contact sensor(s) 309 positioned along the row unit length 212 (e.g. incrementally spaced) may be configured to determine a measured location along the row unit length 212 at which the stalk is completely pulled underneath the row unit 212. The control system 300 may be configured to receive a signal from the non-contact sensor(s) 309 and control the pitch angle actuator to adjust the header pitch angle of the header 200 about the lateral axis 140, such that the entire row unit length 212 is used to process the stalk. For example, if the non-contact sensor(s) 309 detect that only half of row unit length 212 is used to process the stalk, the header pitch angle may be decreased, such that a greater portion of the row unit length 212 is used to process the stalk. Additionally and/or alternatively, the control system 300 may be configured to receive a signal from the non-contact sensor(s) 309 and adjust a speed actuator coupled to adjust a feed roller speed of the feed rollers 218.

Figure 3:
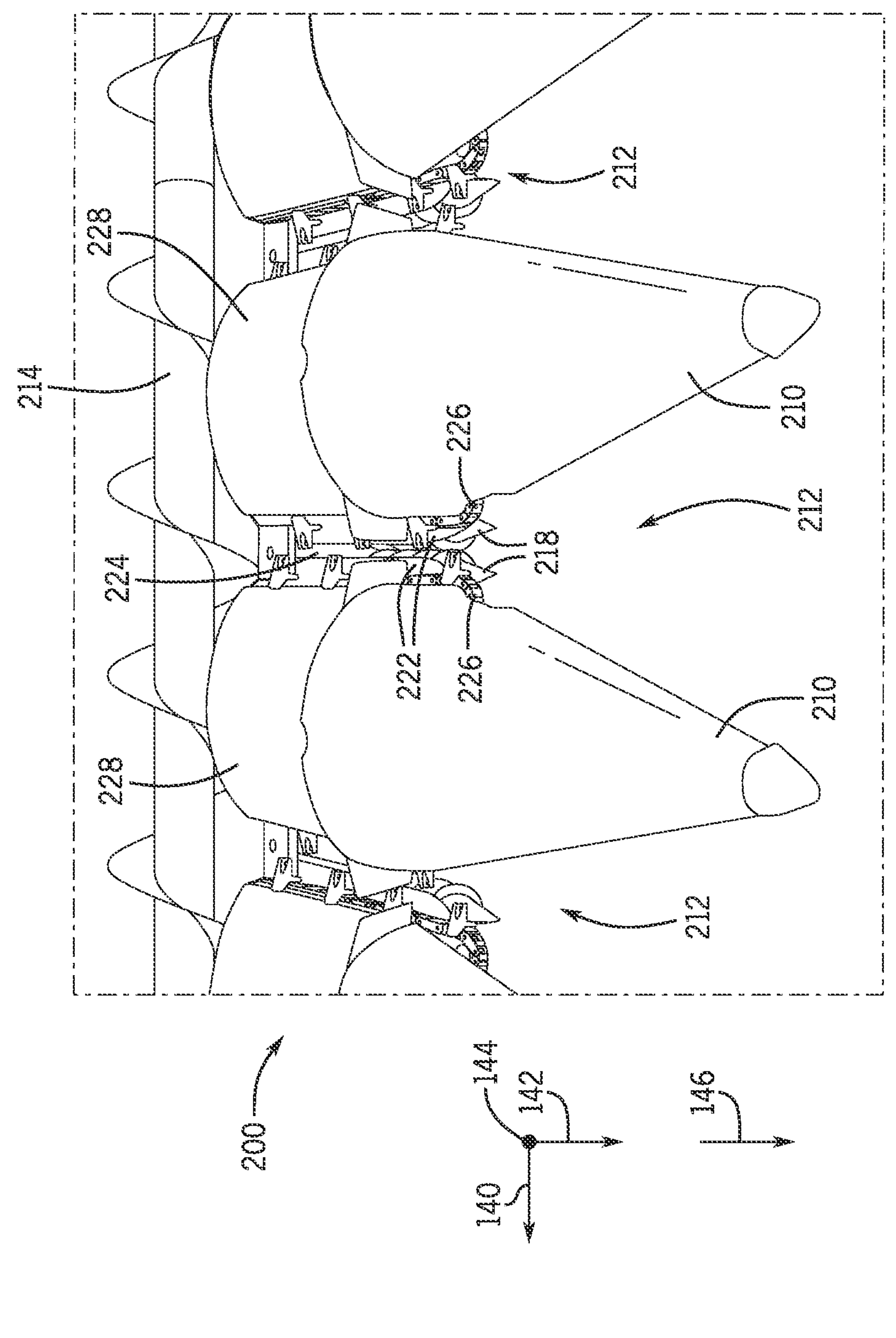
FIG. 3 is a perspective front view of a portion of the corn header of FIG. 2, in accordance with an embodiment of the present disclosure.

FIG. 3 is a perspective front view of an embodiment of a portion of the corn header 200. As shown, the portion of the corn header 200 includes the multiple separators 210 that direct the crops to the row units 212. Each row unit 212 includes various components that operate to separate the crop from the stalk, carry the corn toward the respective auger 214, and return the stalk to the field. As previously discussed, each row unit 212 includes a pair of feed rollers 218 that are configured to grip the stalk and rotate in opposite directions to push the stalk toward the field (e.g., vertically downward; below the header 200). Each row unit 212 also includes a pair of deck plates 222 that are positioned over the pair of feed rollers 218. Each deck plate 222 extends from a first end to a second end along the longitudinal axis 142, and the pair of deck plates 222 are separated from one another along the lateral axis 140 to define a gap 224. Further, each row unit 212 may include a pair of chains 226 (e.g., with lugs) that are configured to drive or push the crop along the pair of deck plates 222 toward the respective auger 214. The pair of deck plates 222 are spaced apart so that the gap 224 is sized to enable the stalks to fall through the gap 224, and to block the crop (e.g., ears of corn) from falling through the gap 224. In some embodiments, the pair of deck plates 222 are adjustable and may be driven (e.g., via an actuator) toward and away from one another along the lateral axis 140 to change a size of the gap 224. A hood 228 is positioned rearward of each separator 210 and between adjacent row units 212 to cover various components, such as the actuator that drives the pair of deck plates 222, linkages, and so forth.

During harvesting operations, the crop may initially make contact with the pair of deck plates 222 toward a forward portion of the pair of deck plates 222 along the longitudinal axis 142/forward direction of travel 146 of the corn header 200. As a result, the stalks may be completely discharged from the corn header 200 before reaching a rear portion of the pair of deck plates 222, thereby reducing a likelihood of the stalks being fed into the respective auger 214.

Figure 4:
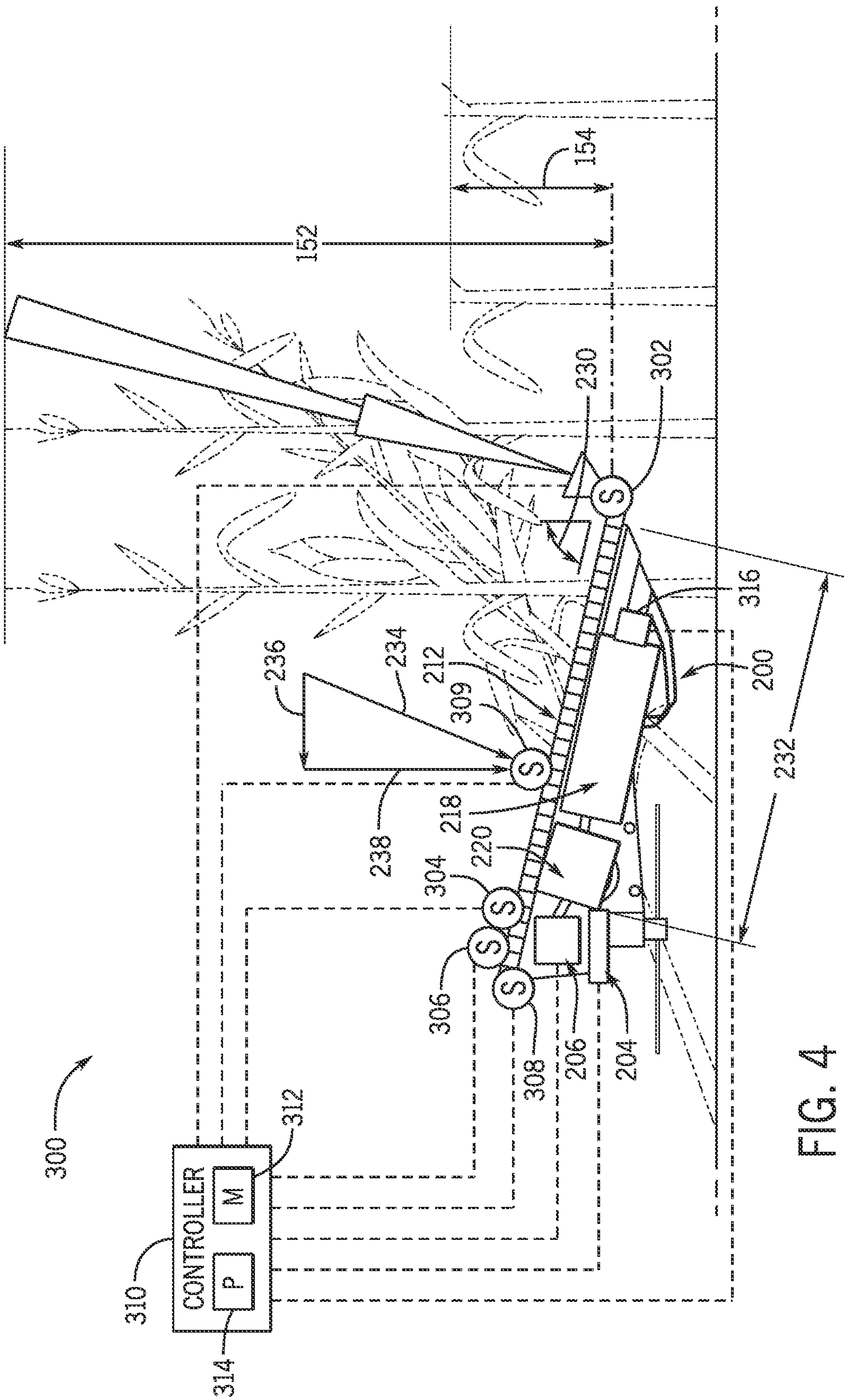
FIG. 4 is a schematic view of an embodiment of a control system that may be employed to control the corn header of FIG. 2, in accordance with an aspect of the present disclosure.

FIG. 4 is a schematic view of an embodiment of the control system 300 that may be employed to control the corn header 200. In the illustrated embodiment, the control system 300 includes a controller 310 configured to receive data from (e.g. communicatively coupled to) the radar sensor(s) 302, lateral sensor(s) 304, force sensor(s) 306, non-contact sensor(s) 308, and rear feed roller(s) 220, and to control operation of at least a portion of the agricultural system, such as the alignment of the corn header 200 with the rows of crops, and the height, lateral position, and angle (e.g., pitch angle and/or roll angle) of the corn header 200. The controller 310 includes a memory 312 and a processor 314 (e.g., a microprocessor). The controller 310 may also include one or more storage devices and/or other suitable components. The processor 314 may be used to execute software, such as software for controlling the corn header. Moreover, the processor 314 may include multiple microprocessors, one or more "general-purpose" microprocessors, one or more special-purpose microprocessors, and/or one or more application specific integrated circuits (ASICS), or some combination thereof. For example, the processor 314 may include one or more reduced instruction set (RISC) or complex instruction set (CISC) processors. The memory 312 may include a volatile memory, such as random access memory (RAM), and/or a nonvolatile memory, such as read-only memory (ROM). The memory 312 may store a variety of information and may be used for various purposes. For example, the memory 312 may store processor-executable instructions (e.g., firmware or software) for the processor 314 to execute, such as instructions for controlling the corn header. The memory 312 and/or the processor 314, or an additional memory and/or processor, may be located in any suitable portion of the agricultural system. By way of example, the controller 310 may be located in the cabin of the agricultural system and/or on the header.

In the illustrated embodiment, the controller 310 is communicatively coupled to the radar sensor(s) 302 and configured to receive data (e.g. digital, analog, voltage, current) from the radar sensor(s). In certain embodiments, the radar sensor(s) 302 are configured to output one-dimensional distance data to the controller 310, and the controller 310 may control the agricultural system (e.g., header row alignment, header height, header angle, or a combination thereof) based on the one-dimensional distance data from the radar sensor(s). For example, the radar sensor(s) 302 may output one-dimensional distance data in real time or near real time. Furthermore, in certain embodiments, at least one radar sensor may be configured to output two-dimensional data to the controller.

The controller 310 may control the one or more actuators of the agricultural system 100 to automatically adjust the row alignment of the header, the header height, the header angle (e.g., pitch angle and/or roll angle), or a combination thereof. The controller 310 may be communicatively coupled to the header height actuator and may be configured to output control signal(s) to the header height actuator to adjust the height of the header relative to the agricultural system chassis. The controller 310 may also be configured to be communicatively coupled to the steering system of the agricultural system and may be configured to output control signal(s) to the steering system to adjust the row alignment of the corn header 200.

In the illustrated embodiment, the radar sensor(s) 302 are coupled to the row unit(s) 212 (e.g. behind the separators and/or to the side of the gap), angled upwardly, and positioned at a height lower than the stalk height 152. In some embodiments, the radar sensor(s) 302 may be aligned with the longitudinal axis 142 and aligned with the rows of crops. In other embodiments, the radar sensor(s) 302 may be oriented at an angle relative to the longitudinal axis 142 (e.g. inward or outward from the longitudinal axis 142). In other embodiments, the radar sensor(s) 302 may be coupled to another location of the corn header 200. In certain embodiments, one or more radar sensors may be coupled to the cabin of the agricultural system (e.g., alone or in combination with the radar sensor(s) coupled to the corn header). In such embodiments, the radar sensor(s) may be angled downward toward the rows of crops, such that the stalk height may be determined by detecting the rows of crops from a height above the stalks. The radar sensor(s) 302 are configured to monitor the stalk height 152 and, in certain embodiments, an ear height 154 (e.g. relative to the row unit(s) 212) of the rows of crops. The controller 310, upon receiving the signal from the radar sensor(s) 302, is configured to determine the stalk height 152 and, in certain embodiments, an ear height 154 of the rows of crops.

In certain embodiments, the controller 310 is configured to control the header pitch actuator 206 to adjust the header pitch angle 230 of the corn header 200 about the lateral axis 140 based on the measured stalk height. Additionally or alternatively, the controller 310 is configured to control the speed actuator 316 to adjust a speed 234 of the feed roller(s) of the row unit(s) based on the measured stalk height. Furthermore, in certain embodiments, the controller 310 is configured to receive a signal from a sensor configured to detect a presence of stalk (e.g. rearward of) the picking location. Upon the controller 310 determining a presence of stalk at (e.g. rearward of) the picking location based on the signal, the controller may be configured to control a speed actuator 316 to adjust the feed roller speed, and/or the controller may control the header pitch actuator 206 to adjust the pitch angle of the corn header 200. Furthermore, in certain embodiments, the controller 310 is configured to receive a first signal from radar sensor(s) 302, and a second signal from a sensor configured to detect a presence of stalk at (e.g. rearward of) the picking location. Upon the controller 310 determining a measured stalk height based on the first signal and the presence of the stalk at (e.g. rearward of) the picking location based on the second signal, the controller 310 may be configured to control a speed actuator 316 to adjust the feed roller speed, and/or the controller may control the header pitch actuator 206 to adjust the pitch angle of the corn header 200.

In certain embodiments, the controller 310 determines a target speed of the feed roller(s) 218 based on a relationship between the target pitch angle of the row unit(s) 212 about lateral axis 140, a radius of the feed roller(s) 218, and a ground speed of the corn header 200. The relationship between target speed of the feed roller(s) 218, the ground speed of the corn header, the radius of the feed roller(s) 218, and the target pitch angle may be described by:

$$\omega = \frac{S_G \sin^2\alpha}{R\cos\alpha}$$

In the above equation, co is the target speed of the feed roller(s) 218, a is the target pitch angle, R is the radius of the feed roller(s), and $S_G$ is the ground speed of the corn header 200. In other embodiments, the target speed of the feed roller(s) 218 may be determined using other techniques. Upon determining the target speed of the feed roller(s) 218, the controller 310 may control the speed actuator 316 to adjust the speed of the feed roller(s) 218 to match the target speed.

In certain embodiments the controller 310 may determine a target header pitch angle 230 based on a relationship between the target pitch angle, the row unit length 232, and the stalk height 152. The relationship between the target header pitch angle 230, the row unit length 232, and the stalk height 152 may be described by:

$$\alpha = \cos^{-1}\left(\frac{L}{H}\right)$$

In the above equation, α is the target pitch angle 230, L is the row unit length 232, and H is the stalk height 152. In other embodiments, the target header pitch angle 230 may be determined using other techniques. Upon determining the target header pitch angle 230, the controller 310 may control the header pitch actuator 206 to adjust the pitch angle of the row unit 212 to match the target header pitch angle 230.

In certain embodiments, the controller 310 may determine a target header pitch angle 230 of the header 200 about the lateral axis 140 based on a relationship between the target header pitch angle 230, the radius of the feed rollers 218, the feed roller speed 234, row unit length 232, the ground speed 156 of the corn header, and the measured stalk height. The relationship between the target header pitch angle 230, the radius of the feed rollers 218, the feed roller speed 234, row unit length 232, the ground speed 156 of the corn header, and the measured stalk height may be described by:

$$\alpha = \sin^{-1}\left(\sqrt{\frac{R\omega L}{S_G H}}\right)$$

In the above equation, α is the target pitch angle, ω is the target speed of the feed roller(s) 218, R is the radius of the feed roller(s) 218, L is the row unit length 232, H is the measured stalk height, and $S_G$ is the ground speed of the corn header 200. In other embodiments, the target header pitch angle 230 may be determined using other techniques. Upon determining the target header pitch angle 230, the controller 310 may control the header pitch actuator 206 to adjust the pitch angle of the row unit 212 to match the target header pitch angle 230.

In certain embodiments, the controller 310 may be configured to determine a baseline target pitch angle of the corn header 200 about the lateral axis 140 based on the measured stalk height and, in certain embodiments, the row unit length 232 and/or the feed roller speed 234. Upon determining the baseline target header pitch angle, the controller 310 may control the header pitch actuator 206 to adjust the pitch angle of the row unit 212 to match the baseline target header pitch angle 230. Furthermore, the controller 310 may be configured to adjust the baseline target pitch angle to achieve an updated target pitch angle based on a threshold (e.g. minimum or maximum angle adjustment), as a means of providing a margin/buffer (e.g. to ensure the stalk does not reach the picking location). Upon determining the updated target header pitch angle, the controller 310 may control the header pitch actuator 206 to adjust the pitch angle of the row unit 212 (e.g. from the baseline target header pitch angle) to match the updated header pitch angle. In some embodiments, the threshold between the baseline target pitch angle and the target header pitch angle commanded by the controller 310 may be adjustable by an operator.

In certain embodiments, the controller 310 may be configured to determine a baseline target feed roller speed based on header pitch angle 230, the ground speed of the corn header 200, the radius of the feed roller(s) 218 and, in certain embodiments, the row unit length 232 and measured stalk height. Upon determining the baseline target feed roller speed, the controller 310 may control the speed actuator 316 to adjust the feed roller speed to match the baseline target feed roller speed. Furthermore, the controller 310 may be configured to adjust the baseline target feed roller speed to achieve an updated target feed roller speed based on a threshold (e.g. minimum or maximum speed adjustment), as a means of providing a margin/buffer (e.g. to ensure the stalk does not reach the picking location). Upon determining the updated target header pitch angle, the controller 310 may control the header pitch actuator 206 to adjust the pitch angle of the row unit 212 (e.g. from the baseline target header pitch angle) to match the updated header pitch angle. In some embodiments, the threshold between the baseline target feed roller velocity and the target feed roller velocity 234 commanded by the controller 310 may be adjustable by an operator.

In certain embodiments, the controller 310 may be configured to control the feed roller speed 234 based on the detection of crops by either the force sensor(s) 306 or non-contact sensor(s) 308 and, in certain embodiments, the ground speed 156 of the agricultural system. For example, the controller 310 may be configured to control the feed roller speed 234 based on a threshold frequency (e.g. relative to the total number of crops being processed by the header) of stalks being detected at (e.g. rearward of) the picking location. For example, if a determined frequency of stalks being detected at (e.g. rearward of) the picking location is greater than a threshold frequency (e.g. 1 percent, 2 percent, 5 percent, 10 percent, etc.), the controller 310 may decrease the feed roller velocity 234. In addition, the controller 310 may increase the feed roller velocity 234 if a determined frequency is less than a minimum threshold frequency (e.g. 1 percent, 2 percent, 5 percent, 10 percent, etc.).

In certain embodiments, the controller 310 may be configured to adjust the measured stalk height based on a presence of stalk at (e.g. rearward of) the picking location. For example, the controller 310 may be configured to estimate a remaining height of stalk rearward of a picking location in response to receiving a signal from non-contact sensor(s) 308 positioned near a picking location. The controller 310 may be configured to adjust a measured stalk height based on the estimated remaining stalk height rearward of the picking location. After adjusting the measured stalk height, the controller 310 may be configured to control a header pitch actuator 206 to adjust a pitch angle of the corn header 200. For example, if the non-contact sensor(s) 308 detect a remaining stalk height at (e.g. rearward of) the picking location, the controller 310 may be configured to add the remaining stalk height to the current measured stalk height, thus reducing the pitch angle of the corn header 200.

In certain embodiments, the controller 310 is configured to control the target header pitch angle 230 based on the detection of crops by either the force sensor(s) 306 or non-contact sensor(s) 308 and, in certain embodiments, the ground speed 156 of the agricultural system. For example, the controller 310 may be configured to control the target header pitch angle 230 based on a threshold frequency of stalks being detected at (e.g. rearward of) the picking location (e.g. relative to the total number of crops being processed by the header). For example, if a determined frequency of stalks being detected at (e.g. rearward of) the picking location is greater than a threshold frequency (e.g. 1 percent, 2 percent, 5 percent, 10 percent, etc.), the controller 310 may decrease (e.g. increase) the target header pitch angle 230. In addition, the controller 310 may increase (e.g. decrease) the target header pitch angle 230 if a determined frequency is less than a minimum threshold frequency (e.g. 1 percent, 2 percent, 5 percent, 10 percent, etc.).

In certain embodiments, the controller 310 may be configured to control the header pitch angle 230 of the corn header 200 about the lateral axis 140 and/or the feed roller speed 234, while concurrently detecting the presence of stalk at (e.g. rearward of) the picking location. For example, the controller 310 may be configured to determine a baseline target pitch angle of the corn header 200 based on a relationship between the target pitch angle, the row unit length 232, and the measured stalk height. Additionally or alternatively, the controller 310 may be configured to determine a baseline target feed roller speed of the feed rollers 218 based on a relationship between the baseline target feed roller speed, the ground speed of the corn header 200, the radius of the feed roller(s) 218, and the target pitch angle. Upon determining the baseline target pitch angle of the corn header 200 and/or baseline target feed roller speed, the controller 310 may control the header pitch actuator 206 to adjust the pitch angle of the row unit 212 to match the baseline target pitch angle of the corn header 200, and/or control the feed roller speed actuator 316 to adjust the feed roller speed 234 to match the baseline target feed roller speed. The controller 310 may then adjust the baseline target pitch angle of the corn header 200 and/or baseline target feed roller speed to establish an updated target pitch angle of the corn header 200 and/or updated target feed roller speed based on the presence of the stalk(s) at (e.g. rearward of) the picking location using the force sensor(s) 306, non-contact sensor(s) 308, lateral sensor(s) 304, or a combination thereof. Upon determining the updated target pitch angle of the corn header 200 and/or updated target feed roller speed, the controller 310 may control the header pitch actuator 206 to adjust the pitch angle of the row unit 212 to match the updated target pitch angle, and/or control the feed roller speed actuator 316 to adjust the feed roller speed 234 to match the updated target feed roller speed.

In certain embodiments, the controller 310 may be configured to control the ground speed 156 of the agricultural system, the feed roller speed 234, or a combination thereof, based on the presence of the stalk(s) at the (e.g. rearward of) the picking location. For example, if the force sensor(s) 306, non-contact sensor(s) 308, or lateral sensor(s) 304 detect the stalk at (e.g. rearward of) the picking location and/or the frequency of stalks at (e.g. rearward of) the picking location are above the threshold frequency, the controller 310 may control the harvester speed control system to decrease the ground speed 156 of the agricultural system and/or control the roller speed actuator to decrease the feed roller speed 234. In certain embodiments, the controller 310 may be configured to control the ground speed 156 of the agricultural system to match the rearward component (e.g. coincident to longitudinal direction 142) of the velocity imparted on the stalks by the feed roller speed 234.

In certain embodiments, the controller 310 may be configured to adjust the length of the feed rollers 218. In one example, multiple sections of feed rollers may be used, and the controller may selectively activate and deactivate the feed roller sections depending on the stalk height 152. For example, it may be desirable to switch from harvesting a tall stalk to a short stalk without changing the header pitch angle 230. In this scenario, feed rollers sections closer to the front end of the row units 212 may be turned off to compensate for the shorter stalk length and to conserve energy.

In certain embodiments, the controller 310 may be configured to control a rearward speed 236 (e.g. relative to the row units 212) or a downward speed 238 (e.g. relative to the row units 212) of the stalk as it traverses from the front side to the picking location. The rearward speed and the downward speed of the stalk may be determined using a relationship based on the feed roller speed, the header pitch angle 230 of the header 200 about lateral axis 140, or a combination thereof.

In certain embodiments, the controller 310 is configured to enable the operator to switch between using the measured stalk height to adjust the header pitch angle 230 of the header 200 about lateral axis 140, and detecting the presence of stalk at (e.g. rearward of) the picking location. In some embodiments, the controller 310 may automatically begin adjusting the header pitch angle 230 when the measured stalk height exceeds a certain threshold height. In certain embodiments, the controller 310 may be configured to automatically begin adjusting the header pitch angle 230 upon detection of stalk at (e.g. rearward of) the picking location.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system of a row unit of a corn header, comprising:

a radar sensor being coupled to the row unit of the corn header at a predetermined angle comprising an upward angle from the row unit, and being positioned at a height below a stalk height of a standing crop;

a controller comprising:

a memory that stores instructions; and one or more processors that execute the instructions, wherein the instructions, when executed by the one or more processors, cause the one or more processors in:

receiving a signal from the radar sensor indicative of a measured stalk height of the standing crop;

determining the measured stalk height based on the signal; and controlling a header pitch actuator that adjusts a pitch angle of the row unit about a lateral axis of the corn header, controlling a speed actuator that adjusts a speed of one or more feed rollers of the row unit, or a combination thereof, based on the measured stalk height.

2. The control system of claim 1, wherein the instructions, when executed by the one or more processors, cause the one or more processors in controlling a ground speed actuator that adjusts a ground speed of the corn header based on:

the pitch angle of the row unit;

a presence of a stalk at a picking location on the row unit, wherein the picking location extends from a front side of a deck plate of the row unit to a rear end of the row unit; or a combination thereof.

3. The control system of claim 1, wherein the instructions, when executed by the one or more processors, cause the one or more processors in:

determining a target pitch angle of the row unit about the lateral axis based on a relationship between the target pitch angle and a length of the row unit and the measured stalk height; and controlling the header pitch actuator that adjusts the pitch angle of the row unit to match the target pitch angle.

4. The control system of claim 3, wherein the relationship between the target pitch angle and the length of the row unit and the measured stalk height comprises:

$$\alpha = \cos^{-1}\left(\frac{L}{H}\right)$$

wherein α denotes the target pitch angle, L denotes the length of the row unit, and H denotes the measured stalk height.

5. The control system of claim 1, wherein the instructions, when executed by the one or more processors, cause the one or more processors in:

determining a target speed of the one or more feed rollers based on; a relationship between the target speed of the one or more feed rollers, a target pitch angle of the row unit about the lateral axis, a radius of the one or more feed rollers, and a ground speed of the corn header; and controlling the speed actuator that adjusts the speed of the one or more feed rollers of the row unit to match the target speed.

6. The control system of claim 5, wherein the relationship between the target speed of the one or more feed rollers and a ground speed of the corn header and a radius of the one or more feed rollers and the target pitch angle comprises:

$$\omega = \frac{S_G \sin^2 \alpha}{R \cos \alpha}$$

wherein ω denotes the target speed of the one or more feed rollers, α denotes the target pitch angle, R denotes the radius of the one or more feed rollers, and $S_G$ denotes the ground speed of the corn header.

7. The control system of claim 1, wherein the instructions, when executed by the one or more processors, cause the one or more processors in:

determining a target pitch angle of the row unit about the lateral axis based on a relationship between the target pitch angle and a length of the row unit and the measured stalk height and a target speed of the one or more feed rollers and a radius of the one or more feed rollers and a ground speed of the corn header;

wherein the relationship between the target pitch angle and the length of the row unit and the measured stalk height and the target speed of the one or more feed rollers and the radius of the one or more feed rollers and the ground speed of the corn header comprises:

$$\alpha = \sin^{-1}\left(\sqrt{\frac{R\omega L}{S_G H}}\right)$$

wherein α denotes the target pitch angle, ω denotes the target speed of the one or more feed rollers, L denotes the length of the row unit, R denotes the radius of the one or more feed rollers, and $S_G$ denotes the ground speed of the corn header; and controlling the header pitch actuator that adjusts the pitch angle of the row unit to match the target pitch angle.

8. A control system of a row unit of a corn header, comprising:

a radar sensor being coupled to the row unit of the corn header at a predetermined angle comprising an upward angle from the row unit, and being positioned at a height below a stalk height of a standing crop;

a controller, comprising:

a memory that stores instructions; and one or more processors that execute the instructions, wherein the instructions, when executed by the one or more processors, cause the one or more processors in:

receiving a signal from the radar sensor and at least one sensor comprising a lateral sensor, the signal being indicative of a presence of a stalk at a picking location on the row unit;

determining the presence of the stalk at the picking location on the row unit based on the signal; and controlling a header pitch actuator that adjusts a pitch angle of the row unit about a lateral axis, controlling a speed actuator that adjusts a speed of one or more feed rollers of the row unit, or a combination thereof, based on the presence of the stalk at the picking location on the row unit.

9. The control system of claim 8, wherein the instructions, when executed by the one or more processors, cause the one or more processors in controlling a ground speed actuator that adjusts a ground speed of the corn header based on;

the pitch angle of the row unit, the presence of the stalk at the picking location on the row unit, or the combination thereof.

10. The control system of claim 8, wherein the at least one sensor further comprises a force sensor positioned at the picking location on the row unit; and wherein the force sensor monitors a force applied by the stalk to the force sensor.

11. The control system of claim 8, wherein the at least one sensor further comprises a torque sensor coupled to a rear feed roller of the one or more feed rollers; and wherein the torque sensor monitors a torque applied by the rear feed roller.

12. The control system of claim 8, wherein the at least one sensor further comprises a non-contact sensor positioned at the picking location on the row unit;

wherein the non-contact sensor is directed towards a front end of the corn header; and wherein the non-contact sensor detects the presence of the stalk at the picking location on the row unit.

13. The control system of claim 8, wherein the lateral sensor comprises a laser and a detector positioned at the picking location on the row unit;

wherein the laser directs a beam along the lateral axis of the corn header; and wherein the detector detects interruption of the beam due to the presence of the stalk at the picking location on the row unit.

14. The control system of claim 12, wherein the non-contact sensor monitors a position of a spring-loaded plate;

wherein the spring-loaded plate positioned at the picking location on the row unit; and wherein the spring-loaded plate, upon contact with the stalk, moves relative to the row unit.

15. A control system of a row unit of a corn header, comprising:

a radar sensor being coupled to the row unit of the corn header at a predetermined angle comprising an upward angle from the row unit, and being positioned at a height below a stalk height of a standing crop;

a controller comprising:

a memory that stores instructions; and one or more processors that execute the instructions, wherein the instructions, when executed by the one or more processors, cause the one or more processors in:

receiving a first signal from a first sensor comprising the radar sensor indicative of a measured stalk height of the standing crop;

receiving a second signal from at least one second sensor comprising a lateral sensor indicative of a presence of a stalk at a picking location on the row unit;

determining the measured stalk height based on the first signal;

determining the presence of the stalk at the picking location on the row unit based on the second signal; and controlling a header pitch actuator that adjusts a pitch angle of the row unit about a lateral axis, controlling a speed actuator that adjusts a speed of one or more feed rollers of the row unit, or a combination thereof, based on the measured stalk height, the presence of the stalk at the picking location on the row unit, or the combination thereof.

16. The control system of claim 15, wherein the picking location extends from a front side of a deck plate of the row unit to a rear end of the row unit;

wherein the lateral sensor comprises a laser and a detector positioned at the picking location on the row unit; and wherein the instructions, when executed by the one or more processors, cause the one or more processors in controlling a ground speed actuator that adjusts a ground speed of the corn header based on:

the pitch angle of the row unit, the presence of the stalk at the picking location on the row unit, or the combination thereof.

17. The control system of claim 15, wherein the instructions, when executed by the one or more processors, cause the one or more processors in:

determining a target pitch angle of the row unit about the lateral axis based on a relationship between the target pitch angle and a length of the row unit and the measured stalk height; and controlling the header pitch actuator that adjusts the pitch angle of the row unit to match the target pitch angle.

18. The control system of claim 15, wherein the instructions, when executed by the one or more processors, cause the one or more processors in:

determining a baseline target pitch angle of the row unit about the lateral axis based on the measured stalk height; and controlling the header pitch actuator that adjusts the pitch angle of the row unit to match the baseline target pitch angle.

19. The control system of claim 18, wherein the instructions, when executed by the one or more processors, cause the one or more processors in:

adjusting the baseline target pitch angle that establishes an updated target pitch angle based on the presence of the stalk at the picking location on the row unit and the baseline target pitch angle; and controlling the header pitch actuator that adjusts the pitch angle of the row unit matches the updated target pitch angle.

* * * * *